US011491887B2

(12) United States Patent
Tsuchiya

(10) Patent No.: US 11,491,887 B2
(45) Date of Patent: Nov. 8, 2022

(54) CHARGE CONTROL DEVICE, VEHICLE, CHARGING SYSTEM, AND CHARGE CONTROL METHOD

(71) Applicant: Toyota Jidosha Kabushiki Kaisha, Toyota (JP)

(72) Inventor: Yoshiyuki Tsuchiya, Hamamatsu (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 150 days.

(21) Appl. No.: 17/065,270

(22) Filed: Oct. 7, 2020

(65) Prior Publication Data

US 2021/0107371 A1 Apr. 15, 2021

(30) Foreign Application Priority Data

Oct. 9, 2019 (JP) .............................. JP2019-185828

(51) Int. Cl.
*B60L 53/60* (2019.01)
*B60L 53/14* (2019.01)
*H02J 7/00* (2006.01)
*B60L 53/67* (2019.01)
*B60L 50/60* (2019.01)

(52) U.S. Cl.
CPC ............. *B60L 53/60* (2019.02); *B60L 50/60* (2019.02); *B60L 53/14* (2019.02); *B60L 53/67* (2019.02); *H02J 7/00032* (2020.01); *H02J 7/0071* (2020.01)

(58) Field of Classification Search
CPC ....................................................... B60L 53/60

USPC .......................................................... 320/109
See application file for complete search history.

(56) References Cited

U.S. PATENT DOCUMENTS

| 9,937,817 B2 * | 4/2018 | Niwa ...................... B60L 53/24 |
| 2013/0257387 A1 * | 10/2013 | Yokoyama .......... H02J 7/00716 320/137 |
| 2013/0274972 A1 * | 10/2013 | Kusumi ................ B60L 53/665 701/22 |
| 2013/0339072 A1 * | 12/2013 | Touge .................... G06Q 10/00 705/5 |

(Continued)

FOREIGN PATENT DOCUMENTS

| JP | 2013-215084 A | 10/2013 |
| JP | 2017-41984 A | 2/2017 |

(Continued)

*Primary Examiner* — Jerry D Robbins
(74) *Attorney, Agent, or Firm* — Dinsmore & Shohl LLP

(57) ABSTRACT

A server includes a charge schedule creation unit that creates a charge schedule for external charging of a vehicle. When user-specified-time information for determining a time to perform the external charging is not given by a user of the vehicle, the charge schedule creation unit creates a first charge schedule. When the user-specified-time information is given, the charge schedule creation unit creates a second charge schedule. In the first charge schedule, a battery mounted in the vehicle is pre-charged with some of power to be charged to the battery, and, after the pre-charging is performed, the battery is charged with a remaining amount of the power during a time period in which an electricity cost is inexpensive. In the second charge schedule, the battery is charged, without the pre-charging being performed.

7 Claims, 10 Drawing Sheets

(56) References Cited

U.S. PATENT DOCUMENTS

| | | | | |
|---|---|---|---|---|
| 2014/0236379 A1* | 8/2014 | Masuda | ................ | H01M 10/44 |
| | | | | 700/297 |
| 2015/0294228 A1* | 10/2015 | Saito | ..................... | G06Q 50/06 |
| | | | | 706/48 |
| 2017/0050527 A1* | 2/2017 | Tsuchiya | ................ | B60L 53/14 |

FOREIGN PATENT DOCUMENTS

| JP | 2017-134571 A | 8/2017 |
|---|---|---|
| JP | 2017-135926 A | 8/2017 |

\* cited by examiner

CHARGE CONTROL DEVICE, VEHICLE, CHARGING SYSTEM, AND CHARGE CONTROL METHOD

CROSS REFERENCE TO RELATED APPLICATIONS

This nonprovisional application claims priority to Japanese Patent Application No. 2019-185828 filed on Oct. 9, 2019 with the Japan Patent Office, the entire content of which is hereby incorporated by reference.

BACKGROUND

Field

The present disclosure relates to a charge control device, a vehicle, a charging system, and a charge control method, and, more particularly, to an external charging technology for charging the power, supplied from charging equipment located outside a vehicle, to a power storage device mounted on the vehicle.

Description of the Background Art

In plug-in hybrid vehicles and electric vehicles, power supplied from charging equipment outside the vehicle is charged to a power storage device, mounted on the vehicle, through "external charging." A technology is proposed in which the external charging is performed according to a predetermined charge schedule. For example, Japanese Patent Laying-Open No. 2017-41984 discloses a charge control device which learns a dwell time of the vehicle for each charging spot. The charge control device estimates a departure time of the vehicle from a charging spot, from a learning result about the charging spot with respect to the dwell time for which the vehicle is dwelling at the charging spot, and the time of arrival of the vehicle at the charging spot, and creates a charge schedule according to the estimated departure time.

If the location at which the vehicle is dwelling is a charging spot (a rest area, a convenience store, etc.) away from home and the vehicle is determined to dwell there temporarily, as the charging connector of charging equipment is connected to the inlet of the vehicle, the charge control device disclosed in Japanese Patent Laying-Open No. 2017-41984 charges the power storage device through the charging equipment immediately, without the charge control device creating a charge schedule for the vehicle (see paragraph [0069] of Japanese Patent Laying-Open No. 2017-41984).

SUMMARY

The electricity cost depends on a time period of the day. From the standpoint of reduction of the electricity cost, desirably, as much power as possible is charged to the power storage device during a particular time of day (e.g., a midnight time period) in which the electricity cost is inexpensive. On the other hand, if a charge schedule is created in which the external charging is scheduled to be performed during the time period in which the electricity cost is inexpensive, the user may have an urgent business or the like and the vehicle may leave the charging spot before the arrival of the time period during which the electricity cost is inexpensive. In this case, the distance over which the vehicle is allowed to travel with the power stored in the power storage device (so called EV range) may be too short. As such, the reduction of the electricity cost and ensuring of the EV range are not always compatible. Thus, desirably, a charge schedule is created which enables these two to reconcile, as appropriate.

The present disclosure is made to solve the problem, and an object of the present disclosure is to enable the reduction of the electricity cost and ensuring of the EV range to reconcile.

(1) A charge control device according to a certain aspect of the present disclosure is a charge control device for external charging, the external charging being charging a power storage device mounted in a vehicle with a power supplied from charging equipment located outside the vehicle. The charge control device includes: a learning unit that learns a departure time of the vehicle; and a creation unit that creates a charge schedule for the external charging, based on a learning result of the learning unit. The creation unit creates a first charge schedule when time information for determining a time to perform the external charging is not given from a user of the vehicle, and creates a second charge schedule when the time information is given from the user. In the first charge schedule, the power storage device is pre-charged with some of power to be charged to the power storage device to, and, after the pre-charging is performed, the power storage device is charged with a remaining amount of the power during a time period in which an electricity cost is inexpensive. In the second charge schedule, the power storage device is charged, without the pre-charging being performed.

(2) The vehicle is capable of the external charging at a plurality of charging spots. The learning unit learns a dwell time of the vehicle for each charging spot. The creation unit creates the first charge schedule based on a learning result of the dwell time with respect to a charging spot at which the vehicle is dwelling, among the plurality of charging spots.

(3) The pre-charging is a charging control which starts charging of the power storage device immediately once an external-charging feasible condition is met.

(4) The time information includes at least one of information related to a time at which the vehicle is expected to leave the charging equipment after the external charging is performed and information related to a time at which the user wished to perform the external charging.

In the configurations (1) to (4) above, different charge schedules for the external charging are used, depending on the presence or absence of the time information provided by the user. In other words, if the time information is not given from the user, the first charge schedule that involves the pre-charging is created for a possible chance of the actual departure time being different from the departure time of the vehicle that is estimated based on the learning result of the learning unit (the estimated departure time). This means that ensuring of the EV range of the vehicle takes precedence over the reduction of the electricity cost. If the time information is given from the user, in contrast, the second charge schedule that involves no pre-charging is employed, considering that the chance of the estimated departure time diverging from the actual departure time is low. This means that the reduction of the electricity cost takes precedence over ensuring of the EV range of the vehicle by charging the battery during the time period in which the electricity cost is inexpensive. Thus, according to the configurations (1) to (4) above, the reduction of the electricity cost and ensuring of the EV range are enabled to reconcile with each other.

(5) When the time information is not given from the user, the creation unit creates the first charge schedule even if the charge control device is solicited to reduce the electricity usage for a demand response for adjusting electricity usage of an entirety of the power system.

According to the configuration (5) above, the time information is not given from the user, the first charge schedule is created and the pre-charging is performed, even if the charge control device is solicited to reduce the electricity usage for the demand response. As described below in more detail, this means that more emphasis is placed on ensuring of the EV range of the vehicle than contributing to leveling out the electricity usage. This can more certainly lessen the user's concern associated with a shortage of the EV range.

(6) A vehicle according to another aspect of the present disclosure includes: a power storage device capable of external charging using power supplied from charging equipment located outside the vehicle; and a control device that control the external charging. The control device includes a learning unit that learns a departure time of the vehicle, and a creation unit that creates a charge schedule for the external charging, based on a learning result of the learning unit. The creation unit creates a first charge schedule when time information for determining a time to perform the external charging is not given from a user of the vehicle, and creates a second charge schedule when the time information is given from the user. In the first charge schedule, the power storage device is pre-charged with some of power to be charged to the power storage device, and, after the pre-charging is performed, the power storage device is charged with a remaining amount of the power during a time period in which an electricity cost is inexpensive. In the second charge schedule, the power storage device is charged, without the pre-charging being performed.

(7) A charging system according to another aspect of the present disclosure includes: a vehicle capable of external charging, the external charging being charging a power storage device mounted in the vehicle with a power supplied from charging equipment outside the vehicle; and a server that creates a charge schedule for the external charging, based on a result of learning a departure time of the vehicle. The server creates a first charge schedule when time information for determining a time to perform the external charging is not given from a user of the vehicle, and creates a second charge schedule when the time information is given from the user. In the first charge schedule, the power storage device is pre-charged with some of power to be charged to the power storage device, and, after the pre-charging is performed, the power storage device is charged with a remaining amount of the power during a time period in which an electricity cost is inexpensive. In the second charge schedule, the power storage device is charged, without the pre-charging being performed.

According to the configurations (6) and (7) above, as with the configuration (1), the reduction of the electricity cost and ensuring of the EV range are enabled to reconcile with each other.

(8) A charge control method according to still another aspect of the present disclosure is a charge control method for external charging, the external charging being charging a power storage device mounted in a vehicle with a power supplied from a charging equipment located outside the vehicle. The charge control method comprising: creating a charge schedule for the external charging, based on a result of learning of a departure time of the vehicle. Creating the charge schedule includes: creating a first charge schedule when time information for determining a time to perform the external charging is not given from a user of the vehicle; and creating a second charge schedule when the time information is given from the user. In the first charge schedule, pre-charging is performed in which some of power that can be charged to the power storage device is pre-charged to the power storage device, and, after the pre-charging is performed, a remaining amount of the power that can be charged to the power storage device is charged to the power storage device during a time period in which an electricity cost is inexpensive. In the second charge schedule, the power storage device is charged, without the pre-charging being performed.

According to the method (8) above, as with the configurations (1), (6), and (7), the reduction of the electricity cost and ensuring of the EV range are enabled to reconcile with each other.

The foregoing and other objects, features, aspects and advantages of the present disclosure will become more apparent from the following detailed description of the present disclosure when taken in conjunction with the accompanying drawings.

DETAILED DESCRIPTION

Hereinafter, the present embodiment will be described, with reference to the accompanying drawings. Note that the same reference signs are used to refer to the same or like parts, and the description will not be repeated.

Embodiment

<Overall System Configuration>

Figure 1:
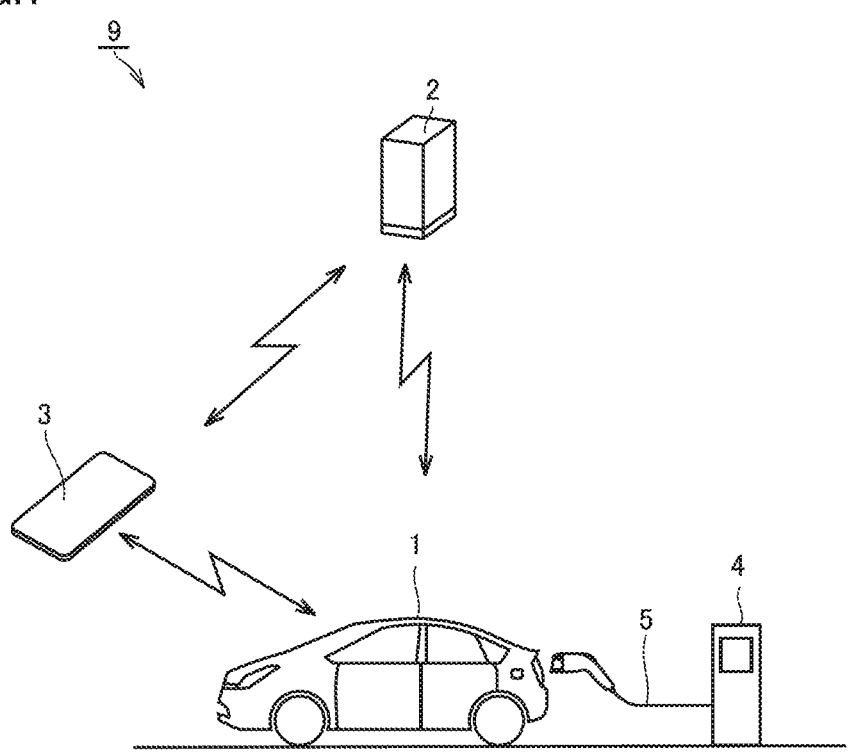
FIG. 1 is a diagram showing an overall configuration of a charging system according to an embodiment of the present disclosure.

FIG. 1 is a diagram showing an overall configuration of a charging system according to an embodiment of the present disclosure. Referring to FIG. 1, a charging system 9 includes a vehicle 1, a server 2, a handheld device 3, and a charging station 4. Vehicle 1 and server 2 are capable of two-way communications with each other. Server 2 and handheld device 3 are also capable of two-way communications with each other. Furthermore, vehicle 1 and handheld device 3 are also capable of two-way communications with each other.

Vehicle 1 is configured to receive supply of power from charging station 4 external to vehicle 1, and charge the power to a battery 12 (see FIG. 2) mounted therein. While vehicle 1 is, for example, an electric vehicle, it may be a plug-in hybrid vehicle. In the present embodiment, vehicle 1 receives the power by having a charging connector, at the tip of a charging cable 5 extending from charging station 4, connect to an inlet 15 (see FIG. 2) of vehicle 1. However, vehicle 1 may receive power, supplied from a transmitter coil (not shown) provided in charging station 4, by a receiving coil (not shown) in a non-contact manner.

Vehicle 1 transmits to server 2 information which is used by server 2 to create a charge schedule for external charging. In the following, this information will also be referred to as "charging information." Vehicle 1 also receives from server 2 a charge schedule created by server 2. Vehicle 1 then performs external charging according to the charge schedule received from server 2.

Server 2 includes a central processing unit (CPU), a memory, input/output ports, etc., none of which are shown. Server 2 creates a charge schedule for vehicle 1, based on various information received from vehicle 1, and transmits the created charge schedule to vehicle 1. The charge schedule creation process by server 2 will be described in detail below.

Handheld device 3 is, for example, a smartphone of a user of vehicle 1. Handheld device 3 receives from server 2 the charge schedule created by server 2 and displays it on a screen (not shown). This allows the user to confirm the charge schedule, created by server 2, on handheld device 3.

Charging station 4 is charging equipment which supplies vehicle 1 with power for external charging. Charging station 4 is located at the home of the user of vehicle 1, for example. However, the location where charging station 4 is installed is not particularly limited. Charging station 4 may be a charging station for the user on the go. Charging station 4 may be located, for example, at a parking lot of the user's workplace or at an accommodation, such as a hotel. While charging station 4 is, typically, alternating-current (AC) charging equipment (so called a normal charger), it should be noted that charging station 4 may be direct-current (DC) charging equipment (so called a fast charger).

<Configuration of Vehicle>

Figure 2:
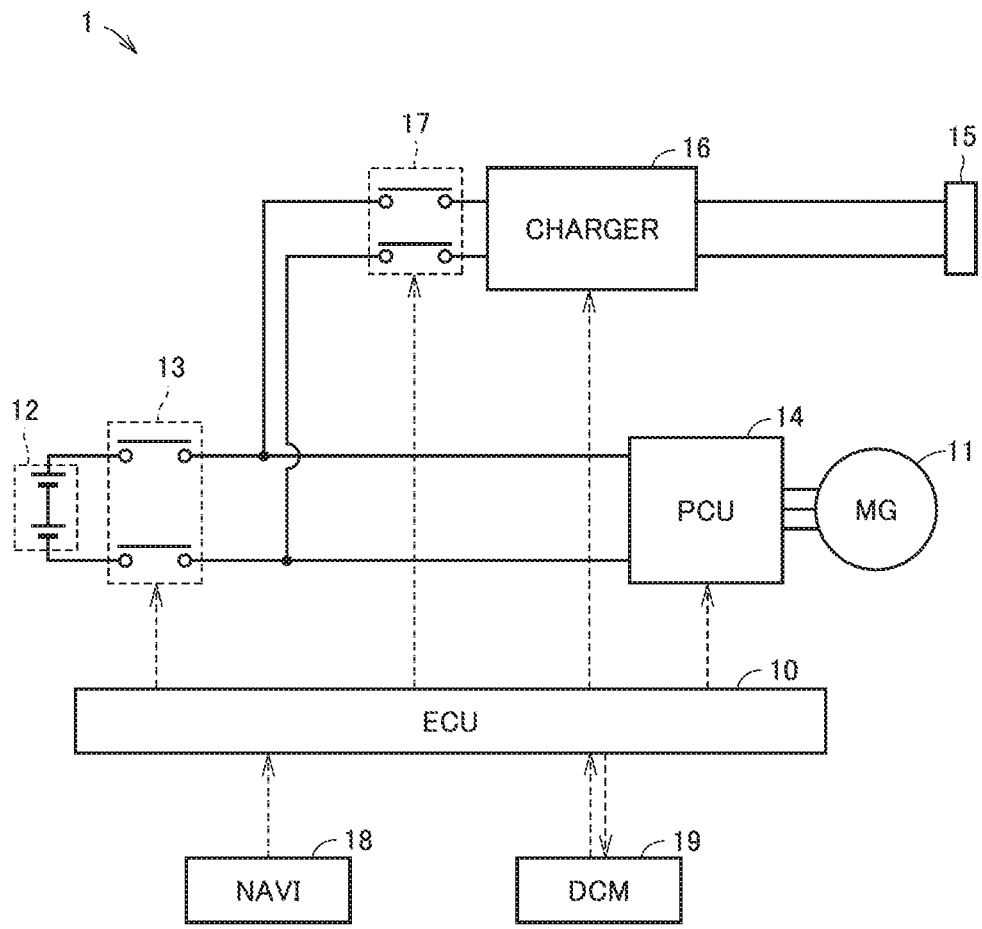
FIG. 2 is a circuit block diagram schematically showing a configuration of a vehicle.

FIG. 2 is a circuit block diagram schematically showing a configuration of vehicle 1. Referring to FIG. 2, vehicle 1 includes a motor generator (MG) 11, a battery 12, a system main relay (SMR) 13, a power control unit (PCU) 14, inlet 15, a charger 16, a charge relay 17, a navigation device (NAVI) 18, a communication module 19, and an electronic control unit (ECU) 10.

Motor generator 11 is an AC rotating electric machine, for example, a three-phase AC synchronous motor. Motor generator 11 drives the driving wheels (not shown) of vehicle 1. Motor generator 11 is also capable of generating power upon braking through a regenerative braking system of vehicle 1.

Battery 12 is a secondary battery, such as a lithium-ion secondary battery or a nickel-hydrogen battery. Battery 12 discharges power for supplying PCU 14 with the power while vehicle 1 is travelling. Power from PCU 14 is charged to battery 12 upon braking of vehicle 1 through the regenerative braking system. Power that is supplied from charging station 4 during external charging is also charged to battery 12. Note that a capacitor may be employed, instead of battery 12. Note that battery 12 corresponds to a "power storage device" according to the present disclosure.

SMR 13 is electrically connected between battery 12 and PCU 14. SMR 13 is a relay for electrically connecting/disconnecting battery 12 to/from a power system. SMR 13 opens/closes in accordance with a command from ECU 10.

PCU 14 includes a converter and an inverter, none of which are shown. PCU 14 boosts the voltage from battery 12, converts the boosted DC power into AC power, and drives motor generator 11 with the AC power. PCU 14 also rectifies the power generated by motor generator 11, steps down the voltage of the power, and charges that power to battery 12.

Inlet 15 is a charging port for charging the power supplied from charging station 4 to battery 12. Inlet 15 is configured to be connectable to the charging connector at the tip of charging cable 5 (see FIG. 1).

Charger 16 is a charging device electrically connected between inlet 15 and SMR 13. In accordance with a command from ECU 10, charger 16 converts the power supplied from charging station 4 connected to inlet 15, into power which can be charged to the battery 12, and outputs the power to battery 12.

Charge relay 17 is electrically connected between battery 12 and charger 16. Charge relay 17 closes according to a command from ECU 10 to electrically connect battery 12 and charger 16. Charge relay 17 also opens according to a command from ECU 10 to electrically disconnect battery 12 and charger 16 from each other.

Navigation device 18 utilizes GPS (global positioning system) and outputs information indicative of the current location of vehicle 1 to ECU 10. The current location information of vehicle 1 is transmitted to server 2 through communication module 19 as one of charging information that is used to perform the external charging of vehicle 1.

Communication module 19 is a data communication module (DCM) capable of two-way communications with handheld device 3 or server 2 provided outside the vehicle 1, for example.

ECU 10 includes a CPU, a memory, and input/output ports, none of which are shown. Based on a signal (a command) from each sensor and device and maps and programs stored in the memory, ECU 10 controls each device so that vehicle 1 is brought into a desired state.

<Server Configuration>

Figure 3:
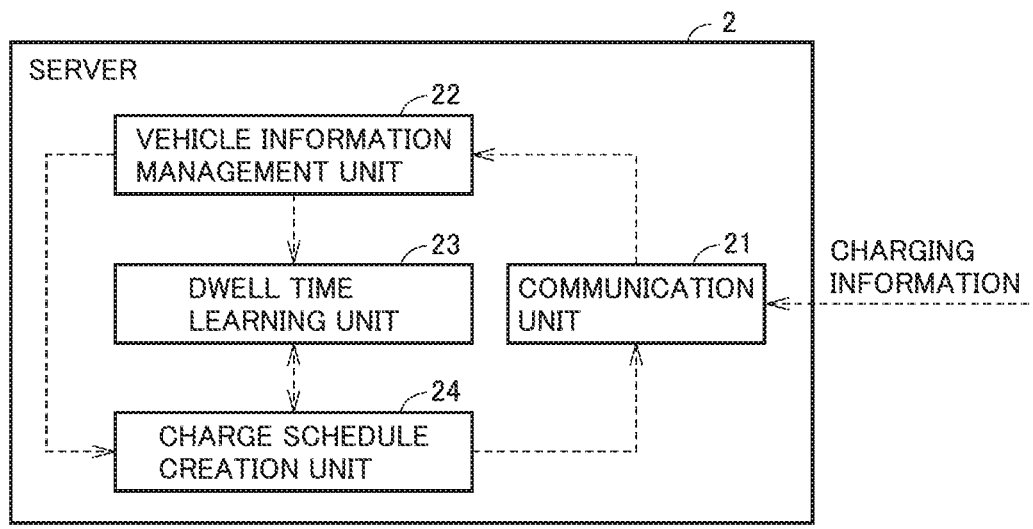
FIG. 3 is a functional block diagram of a configuration of a server according to the embodiment.

FIG. 3 is a functional block diagram of a configuration of server 2 according to the embodiment. Referring to FIG. 3, server 2 includes a communication unit 21, a vehicle information management unit 22, a dwell time learning unit 23, and a charge schedule creation unit 24. Note that, in the present embodiment, server 2 corresponds to a "charge control device" according to the present disclosure.

Communication unit 21 receives from vehicle 1 the charging information for vehicle 1. Communication unit 21 also transmits to vehicle 1 a charge schedule created by charge schedule creation unit 24.

Vehicle information management unit 22 obtains the charging information from vehicle 1 through communication unit 21, and manages the obtained information in association with vehicle 1 and charging station 4 (a charging spot). More specifically, as the charging information from vehicle 1, vehicle information management unit 22 obtains dwell information, the current location information, and charging-amount information from vehicle 1.

The dwell information includes information related to the time of arrival of vehicle 1 at charging station 4, and information related to the departure time of vehicle 1 from charging station 4. The dwell information is managed for each charging station 4. The dwell information is obtained from vehicle 1 each time the vehicle 1 dwells at a charging spot.

The current location information includes GPS information of vehicle 1. The charging-amount information includes information, such as the capacity (unit: Wh) of battery 12 (see FIG. 2) mounted in vehicle 1, SOC (State Of Charge), etc. While the current location information and the charging-amount information may be transmitted from vehicle 1 to server 2 time after time, they are transmitted from vehicle 1 to server 2 upon arrival of vehicle 1 at charging station 4.

Dwell time learning unit 23 learns the dwell time of vehicle 1 for each charging station 4, using the dwell information managed by vehicle information management unit 22 for each charging station 4. The dwell time is calculated by a time difference between the arrival time at charging station 4 and the departure time from charging station 4. Note that dwell time learning unit 23 corresponds to a "learning unit" according to the present disclosure.

Charge schedule creation unit 24 creates a charge schedule for external charging. More specifically, charge schedule creation unit 24 can estimate the departure time of vehicle 1 from a learning result of dwell time learning unit 23 with respect to charging station 4 at which vehicle 1 will dwell and the time of arrival of vehicle 1 at that charging station 4. Charge schedule creation unit 24 then creates a charge schedule so that charging of battery 12 will be completed prior to the estimated departure time of vehicle 1 (estimated departure time). Note that charge schedule creation unit 24 corresponds to a "creation unit" according to the present disclosure.

While the present embodiment will be described with reference to learning the dwell time for each charging station 4, it should be noted that what is learned by the "learning unit" according to the present disclosure is not limited thereto. The "learning unit" may learn the departure time of vehicle 1 according to a time frame. For example, the "learning unit" may learn the departure time of vehicle 1 daily, weekly, per weekdays/weekend (including holidays), or monthly.

Comparative Example

In general, the electricity cost depends on a time period of the day. In the present embodiment, suppose that the electricity cost is least expensive during the midnight time period of a day. Initially, Comparative Example will be described in which the charge schedule is created under the following circumstances in this fee structure.

Figure 4:
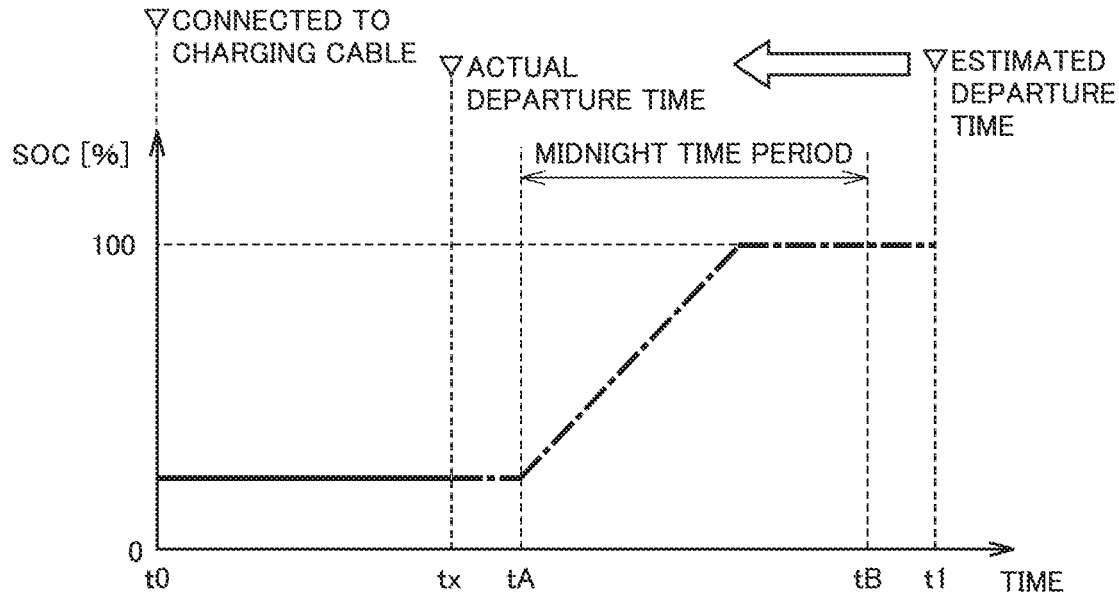
FIG. 4 is a time diagram showing one example of a charge schedule created in Comparative Example.
Figure 5:
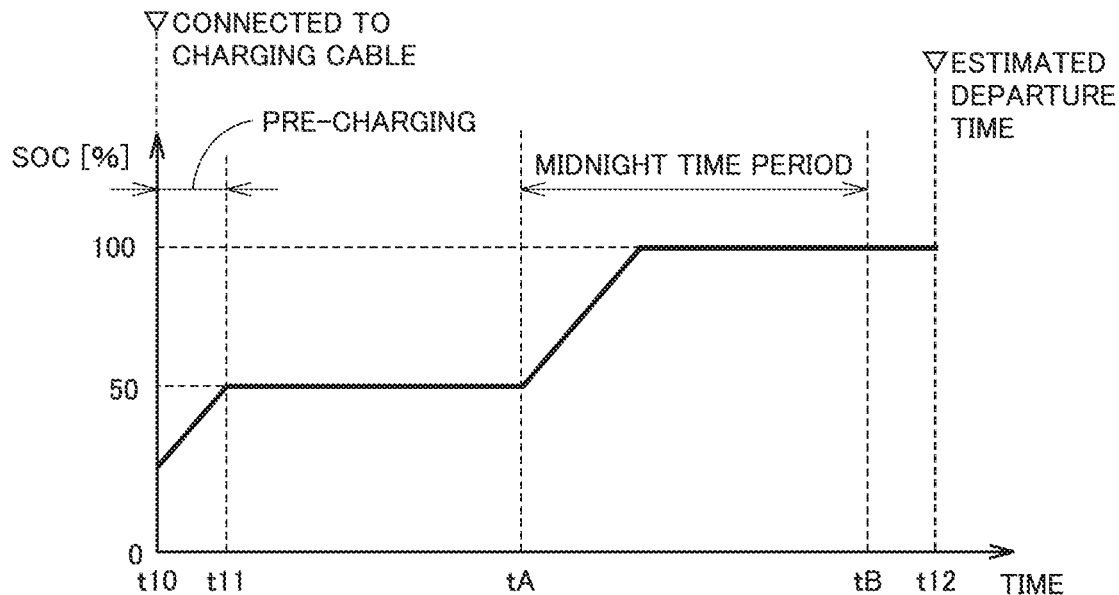
FIG. 5 is a time diagram showing one example of a first charge schedule.
Figure 6:
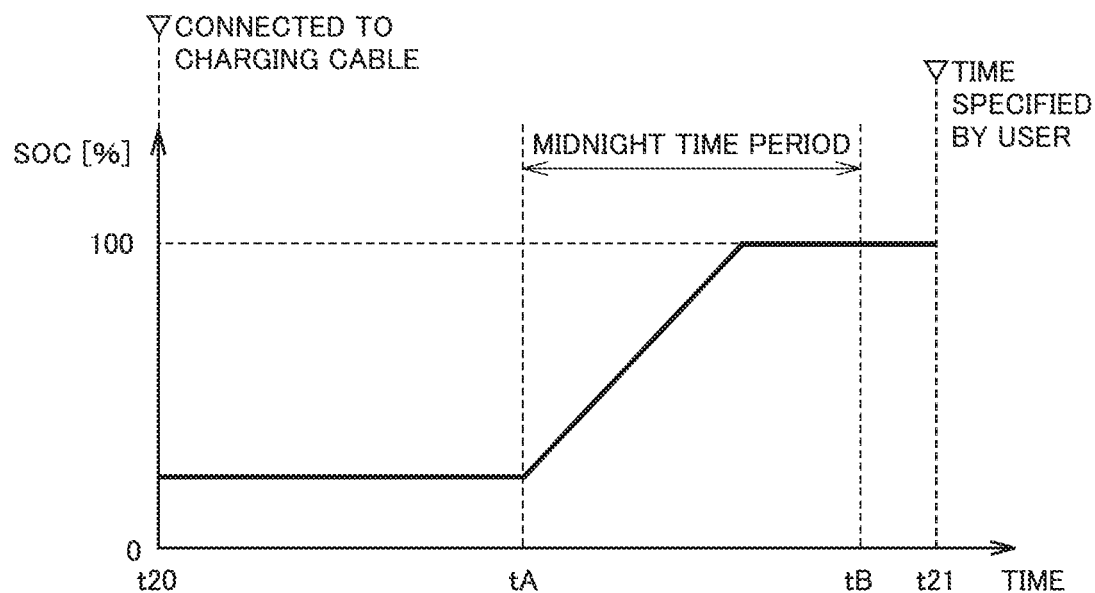
FIG. 6 is a time diagram showing one example of a second charge schedule.

FIG. 4 is a time diagram showing one example of a charge schedule created in Comparative Example. In FIG. 4 and FIGS. 5 and 6 described below, an elapsed time since the time at which vehicle 1 and charging station 4 are connected together by charging cable 5 is indicated on the horizontal axis. The SOC of battery 12 is indicated on the vertical axis.

Referring to FIG. 4, assume a situation in which the user comes back home by vehicle 1 in the evening of a certain day. At time t0, charging station 4 installed at the user's home and vehicle 1 are connected together by charging cable 5. Based on a learning result with respect to the dwell time of vehicle 1 at charging station 4 installed at the user's home, server 2 estimates that vehicle 1 will leave home the next morning. In this example, time t1 is the estimated departure time in the next morning.

In this case, from the standpoint of reduction of the electricity cost, server 2 creates a charge schedule which allows as much power as possible to be charged to battery 12 during the midnight time period. In the example shown in FIG. 4, server 2 creates a charge schedule which causes vehicle 1 to wait until the midnight time period, without performing the external charging, and starts the external charging immediately upon arrival of the start time tA of the midnight time period.

However, the estimated departure time of vehicle 1 that is based on a learning result with respect to the past dwell time is not always accurate. There is a chance that the estimated departure time diverges from the actual departure time. For example, if vehicle 1 leaves home at time tx which is prior to the start time tA of the midnight time period, the power stored in battery 12 remains unchanged since the time the vehicle 1 came home (time t0), which may thus results in vehicle 1 having an excessively short EV range.

<Pre-Charging>

Thus, the present embodiment employs a configuration in which "pre-charging" is incorporated into the charge schedule. In the pre-charging, partial external charging is performed promptly once the charging station 4 and vehicle 1 are connected together by charging cable 5. However, as described below, the incorporation of the pre-charging into the charge schedule is subject to a certain condition. The charge schedule having the pre-charging incorporated therein will be referred to as "first charge schedule," and the charge schedule having no pre-charging incorporated therein will be referred to as "second charge schedule." Server 2 creates one of the first charge schedule and the second charge schedule, depending on the situation the vehicle 1 is put in.

FIG. 5 is a time diagram showing one example of the first charge schedule. Referring to FIG. 5, the first charge schedule is created if the charging information transmitted from vehicle 1 contains no information indicating the departure time of vehicle 1 specified by the user and the departure time of vehicle 1 is estimated by server 2 from the past learning results. In the example of FIG. 5, the estimated departure time of the user is time t12 after the external charging is performed during the midnight time period.

If SOC of battery 12 is less than a predetermined value (50% in this example) at time t10 of connection of charging cable 5 to inlet 15 of vehicle 1, the first charge schedule involves performing the pre-charging. In the pre-charging, the external charging is performed until SOC of battery 12 reaches 50%, irrespective of whether the current time is within the midnight time period or not.

As SOC of battery 12 reaches 50% at time t11, the pre-charging stops and its status is maintained until the start time tA of the midnight time period. Thereafter, as the midnight time period arrives at time tA, the external charging starts and the external charging is performed until battery 12 is fully charged (the state where SOC=100%).

FIG. 6 is a time diagram showing one example of the second charge schedule. Referring to FIG. 6, the second charge schedule is created if the charging information transmitted from vehicle 1 contains information indicating the departure time of vehicle 1 specified by the user. In the example shown in FIG. 6, the time specified by the user (an expected time of departure in this example) is time t21 which is after the end time tB of the midnight time period.

Unlike the first charge schedule, in the second charge schedule, vehicle 1 is not pre-charged at time t20 even if charging cable 5 is connected to inlet 15 of vehicle 1. Vehicle 1 waits until the arrival of the midnight time period, while having charging cable 5 connected thereto, without performing the external charging. As the midnight time period arrives, the external charging starts (time tA) and is performed until battery 12 is fully charged.

If the user fails to input an expected time of departure or a desired time to end the external charging, a time to perform the external charging considered by the user is not determined. Consequently, the estimated departure time of vehicle 1 may be significantly far from the actual departure time. Accordingly, in the first charge schedule, the pre-charging is performed in preparation for a chance of divergence of the estimated departure time, and power is charged to battery 12 until SOC=50% is satisfied. This means that ensuring of the EV range of vehicle 1 takes precedence over the reduction of the electricity cost.

In contrast, server 2 is not required to estimate the departure time if an expected time of departure is input by the user or a desired time to end the external charging is input by the user. Furthermore, in these cases, since the user specifies such a time, knowing his/her own schedule, vehicle 1 is contemplated to be less likely to leave for the destination prior to the time specified by the user. Accordingly, the second charge schedule does not involve performing pre-charging. In some embodiments, the server 2 may create a second charge schedule which allows as much power as possible to be charged to battery 12 under the fee structure for the midnight time period. This allows reduction of electricity cost, as compared to charging the battery 12 in a time period other than a time period in which the electricity cost is inexpensive (other than the midnight time period). However, in some embodiments, the charging time according to the second charge schedule may not be the time period in which the electricity cost is inexpensive (the midnight time period).

While the description has been given with respect to FIGS. 5 and 6 that the pre-charging is performed until SOC of battery 12 reaches 50%, it should be noted that the charge mode for the pre-charging is not limited thereto. The pre-charging may be performing the external charging so that SOC increases by a predetermined amount (e.g., by 30%). While the description has been given that the external charging starts immediately upon the arrival of the start time of the midnight time period, the charge mode for the external charging during the midnight time period is also not limited thereto. In general, the longer the battery is left at high SOC, the easier the battery deteriorates. Thus, the external charging may be started as late as possible during the midnight time period to an extent that the charging will be in time for the expected time of departure of vehicle 1 so that the battery is left at high SOC in as short time as possible.

In the example of the pre-charging shown in FIG. 5, as the charging connector of charging cable 5 is connected to inlet 15 of vehicle 1, an external-charging feasible condition is determined to be met and battery 12 is charged immediately. Starting the charging of battery 12 immediately as such (what is called immediate charging) is advantageous that the battery 12 is charged even if vehicle 1 leaves charging station 4 earlier than scheduled. However, in some embodiments, the start of the charging may not be instantly in the pre-charging. Charging of battery 12 may be started, for example, after an elapse of a predetermined time period since the external-charging feasible condition has been met.

Furthermore, if vehicle 1 performs non-contact charging in which vehicle 1 receives power from charging station 4 in a non-contact manner, an external-charging feasible condition is met upon completion of alignment of a transmitter coil embedded in the ground and a receiving coil mounted in vehicle 1, at which time the immediate charging is allowed to start.

<Charge Schedule Creation Flow>

Figure 7:
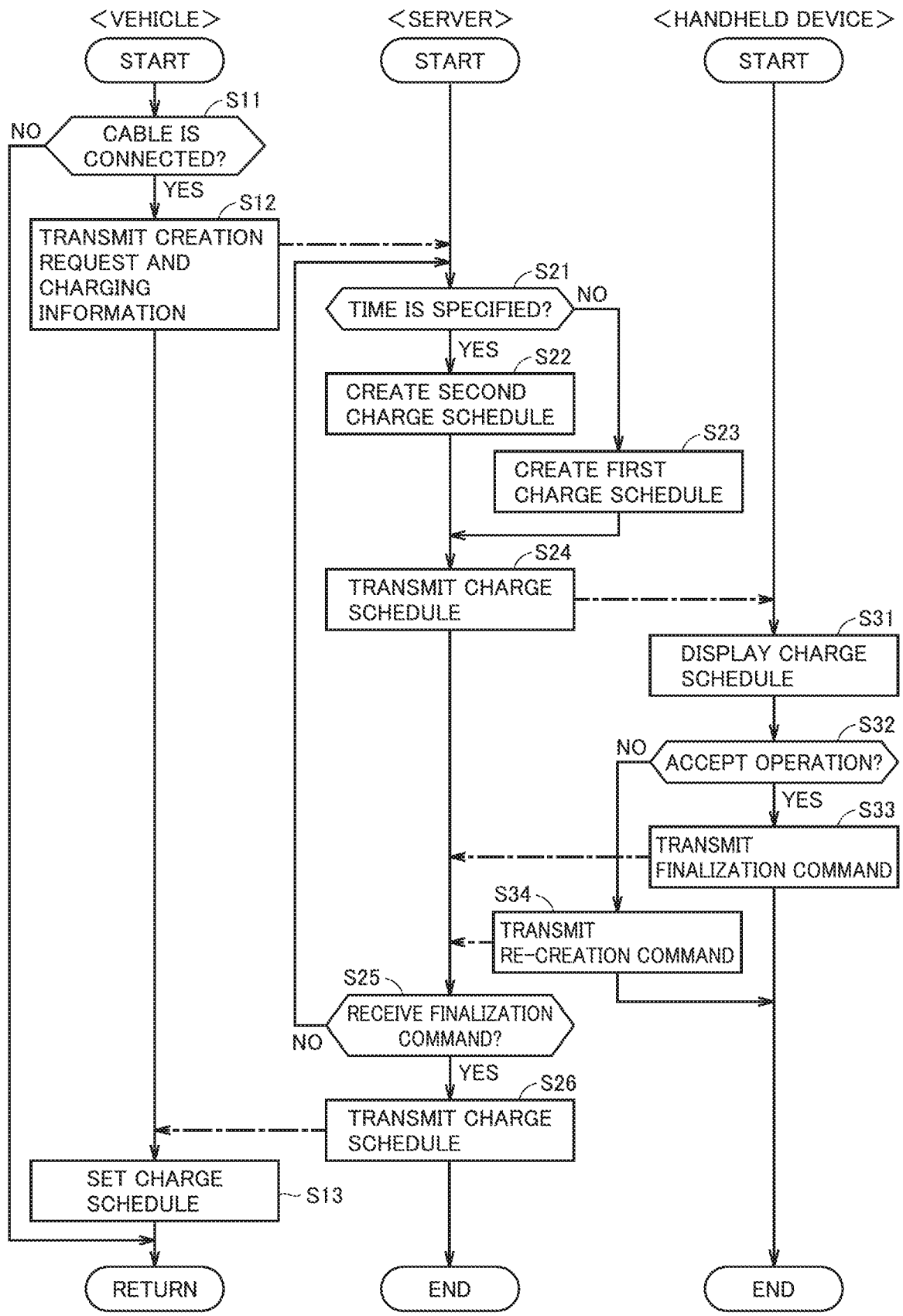
FIG. 7 is a flowchart illustrating the procedure of a charge schedule creation process according to the embodiment.

FIG. 7 is a flowchart illustrating the procedure for a charge schedule creation process according to the embodiment. FIG. 7 shows a series of processes performed by vehicle 1 (ECU 10 of vehicle 1) on the left hand side of the figure, a series of processes performed by server 2 in the middle, and a series of processes performed by handheld device 3 on the right hand side of the figure. The processes performed by server 2 are implemented by software processing by server 2, but they may be implemented by hardware processing which uses an electric circuit fabricated within server 2. The same is true for vehicle 1.

Referring to FIG. 7, in S11, vehicle 1 determines whether the charging connector of charging cable 5 is connected to inlet 15. If the charging connector of charging cable 5 is not connected to inlet 15 (NO in S11), the process returns to the main routine, and the series of processes starts again after the elapse of a predetermined period.

If the charging connector of charging cable 5 is connected to inlet 15 (YES in S11), vehicle 1 requests the creation of a charge schedule and transmits to server 2 the information necessary for external charging (the charging information) (S12). Specifically, vehicle 1 transmits information related to SOC of battery 12 to server 2. If the user specifies an expected time of departure or a desired time to end the external charging, vehicle 1 transmits information indicative of the specified time to server 2. Note that the charge schedule creation request may be transmitted from handheld device 3 to server 2. The charging information may also be transmitted periodically from vehicle 1 to server 2.

Upon receipt of the charge schedule creation request and the charging information from vehicle 1, server 2 determines whether the charging information contains time information (user-specified-time information), such as the expected time of departure or desired time to end the external charging specified by the user (S21). Note that the user-specified-time information corresponds to "time information" according to the present disclosure.

If the charging information contains the user-specified-time information (YES in S21), server 2 creates a second charge schedule which involves no pre-charging (S22). As described with respect to FIG. 6, the server 2 may create a charge schedule which allows as much power as possible to be charged to battery 12 during the midnight time period in order to reduce the electricity cost, provided that the external charging is completed by the time specified by the user. As mentioned above, in order to suppress the degradation of battery 12, server 2 may consider reduction of the wait time since battery 12 has been fully charged until the time specified by the user.

In contrast, if the charging information contains no user-specified-time information (NO in S21), server 2 creates a first charge schedule (S23). Specifically, if SOC of battery 12 is less than a predetermined value (e.g., 50%) at the current time, server 2 incorporates into the charge schedule, the pre-charging through which the SOC increases to 50%. Furthermore, server 2 estimates the departure time of vehicle 1 from a learning result about this charging station 4 with respect to the dwell time and the time of arrival at charging station 4 (specifically, the estimated departure time=the time of arrival+the dwell time). Next, server 2 creates a charge schedule which allows the external charging to be completed by the estimated departure time and the remaining power to be charged to charge the battery 12 (remaining amount of power to charge after the pre-charging) as much as possible during the midnight time period.

In S24, server 2 transmits the created charge schedule (one of the first charge schedule and the second charge schedule) to handheld device 3. Upon receipt of the charge schedule from server 2, handheld device 3 displays the received charge schedule on a screen (not shown) (S31). The user confirms the charge schedule displayed on the screen to make sure if the charge schedule is appropriate.

If the user determines the charge schedule to be appropriate and performs an operation for accepting the charge schedule (YES in S32), handheld device 3 transmits a command for finalizing the charge schedule (a finalization command) to server 2 (S33). In contrast, if the user determines the charge schedule to be not appropriate and performs an operation for re-adjusting the charge schedule (NO in S32), handheld device 3 transmits a command for re-creating the charge schedule (a re-creation command) to server 2 (S34). At this time, desirably, handheld device 3 transmits to server 2 information representing a change the user wishes to make to the charge schedule (e.g., the information indicating that the user wishes to move up the time to start charging), together with the re-creation command.

In S25, server 2 determines whether server 2 has received the charge schedule finalization command from handheld device 3. If received the finalization command (YES in S25), server 2 proceeds the process to S26, finalizes the charge schedule which the server 2 has transmitted to handheld device 3 in S24, and transmits the finalized charge schedule also to vehicle 1. Upon receipt of the finalized charge schedule, vehicle 1 sets the received charge schedule (S13). In this way, external charging of battery 12 is performed in vehicle 1, according to the charge schedule received from server 2.

In contrast, if server 2 does not receive the charge schedule finalization command from handheld device 3, that is, if server 2 receives a charge schedule re-creation command from handheld device 3 (NO in S25), server 2 returns the process to S21. This repeats the series of processes and the charge schedule is re-created.

The example has been described with respect to FIG. 7 in which server 2 transmits the charge schedule to handheld device 3, and the user confirms the charge schedule using handheld device 3. However, the destination to which the charge schedule is transmitted is not limited to handheld device 3. For example, the charge schedule may be transmitted to navigation device 18 mounted in vehicle 1. The user is allowed to look at the screen of navigation device 18 to confirm the charge schedule.

As described above, in the present embodiment, the first charge schedule and the second charge schedule for the external charging can be used, depending on whether the time is specified by the user or not. If the time is not specified by the user, the first charge schedule that involves pre-charging is employed for a possible chance of the actual departure time being different from the estimated departure time, prioritizing the ensuring of the EV range of vehicle 1 over the reduction of the electricity cost. If the time is specified by the user, in contrast, a second charge schedule that involves no pre-charging is employed, considering that the chance of the specified time diverging from the actual departure time is low. In some embodiments, the second charge schedule involves reduction of electricity cost by charging the battery 12 during the midnight time period. Owing to this, according to the present embodiment, the reduction of the electricity cost and ensuring of the EV range are enabled to reconcile with each other.

Variation 1 of Embodiment

While in the examples shown in the embodiment, the series of processes proceeds through communications between vehicle 1 and server 2, server 2 may be omitted in some embodiments. The entirety of the series of processes may be performed by vehicle 1, as described below. In Variation 1, ECU 10 included in vehicle 1 corresponds to a "charge control device" according to the present disclosure.

Figure 8:
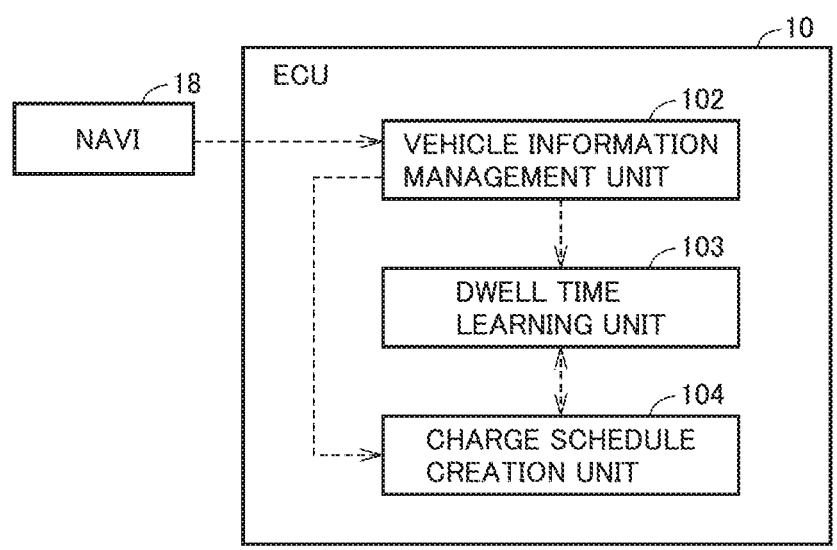
FIG. 8 is a functional block diagram of a configuration of an ECU included in a vehicle according to Variation 1 of the embodiment.

FIG. 8 is a functional block diagram of a configuration of ECU 10 included in vehicle 1 according to Variation 1 of the embodiment. Referring to FIG. 8, ECU 10 includes a vehicle information management unit 102, a dwell time learning unit 103, and a charge schedule creation unit 104. For example, vehicle information management unit 102 obtains the current location information of vehicle 1, including the GPS information, from navigation device 18, and the charging-amount information, including information, such as the capacity or SOC of battery 12, from sensors (not shown) included in battery 12. Regarding the other functions, vehicle information management unit 102, dwell time learning unit 103, and charge schedule creation unit 104 are basically comparable to vehicle information management unit 22, dwell time learning unit 23, and charge schedule creation unit 24 (see FIG. 3), respectively, included in server 2.

Figure 9:
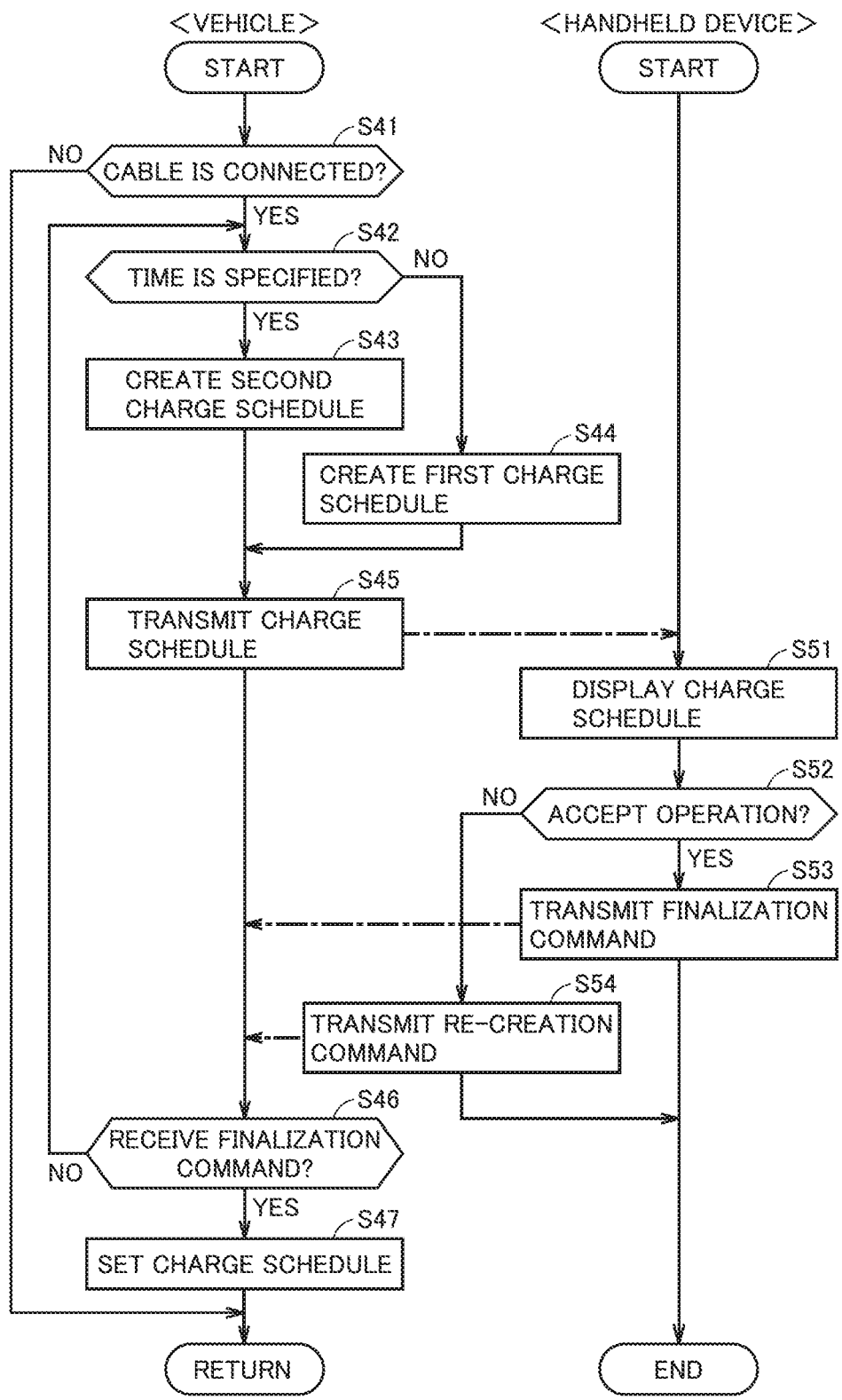
FIG. 9 is a flowchart illustrating the procedure of a charge schedule creation process according to Variation 1 of the embodiment.

FIG. 9 is a flowchart illustrating the procedure for a charge schedule creation process according to Variation 1 of the embodiment. FIG. 9 shows a series of processes performed by ECU 10 included in vehicle 1 on the left hand side of the figure, and a series of processes performed by handheld device 3 on the right hand side of the figure. The processes performed by ECU 10 are implemented by software processing by ECU 10, but they may be implemented by hardware processing which uses an electric circuit fabricated within ECU 10.

Referring to FIG. 9, in S41, vehicle 1 determines whether the charging connector of charging cable 5 is connected to inlet 15. If the charging connector of charging cable 5 is connected to inlet 15 (YES in S41), ECU 10 determines whether information necessary for the external charging (the charging information) contains time information (user-specified-time information), such as an expected time of departure or a desired time to end the external charging, which is specified by the user (S42).

If the charging information contains the user-specified-time information (YES in S42), ECU 10 creates a second charge schedule (S43). In contrast, if the charging information contains no user-specified-time information (NO in S42), ECU 10 creates a first charge schedule (S44). The ways of creation of the first charge schedule and the second charge schedule are the same as those according to the embodiment.

In S45, ECU 10 transmits the charge schedule created in S43 or S44 to handheld device 3. Upon receipt of the charge schedule from ECU 10, handheld device 3 displays the charge schedule on the display for user confirmation (S51).

If the user performs an operation for accepting the charge schedule (YES in S52), handheld device 3 transmits a command for finalizing the charge schedule (a finalization command) to ECU 10 (S53). In contrast, if the user performs an operation for re-adjusting the charge schedule (NO in S52), handheld device 3 transmits a command for re-creating the charge schedule (a re-creation command) to ECU 10 (S54).

In S46, ECU 10 determines whether ECU 10 has received the charge schedule finalization command from handheld device 3. If received the finalization command (YES in S46), ECU 10 finalizes the charge schedule transmitted to handheld device 3, and sets the finalized charge schedule (S47). In this way, external charging of battery 12 is performed in vehicle 1 according to the finalized charge schedule. In contrast, upon receipt of a charge schedule re-creation command (NO in S46), ECU 10 returns the process to S42, and repeats the series of processes to re-create the charge schedule. As described above, even if server 2 is not intervening in Variation 1, ECU 10 included in vehicle 1 uses the first charge schedule and the second charge schedule, depending on whether the time is specified by the user or not. In this way, according to Variation 1, as with the embodiment, the reduction of the electricity cost and ensuring of the EV range are enabled to reconcile with each other.

Variation 2 of Embodiment

In recent years, the power system relying on large scale power plants owned by power companies is reviewed, and a scheme is being constructed in which an energy resource (hereinafter, also referred to as "demand side resources (DSR)") owned by each customer is utilized for the power system. Virtual power plant (VPP) is proposed as a scheme utilizing the DSR for the power system. The VPP is a scheme which controls a large number of DSRs remotely and in an integrated manner by a sophisticated energy management technology employing IoT (Internet of Things), thereby allowing the DSRs to function as if they are one power plant.

Figure 10:
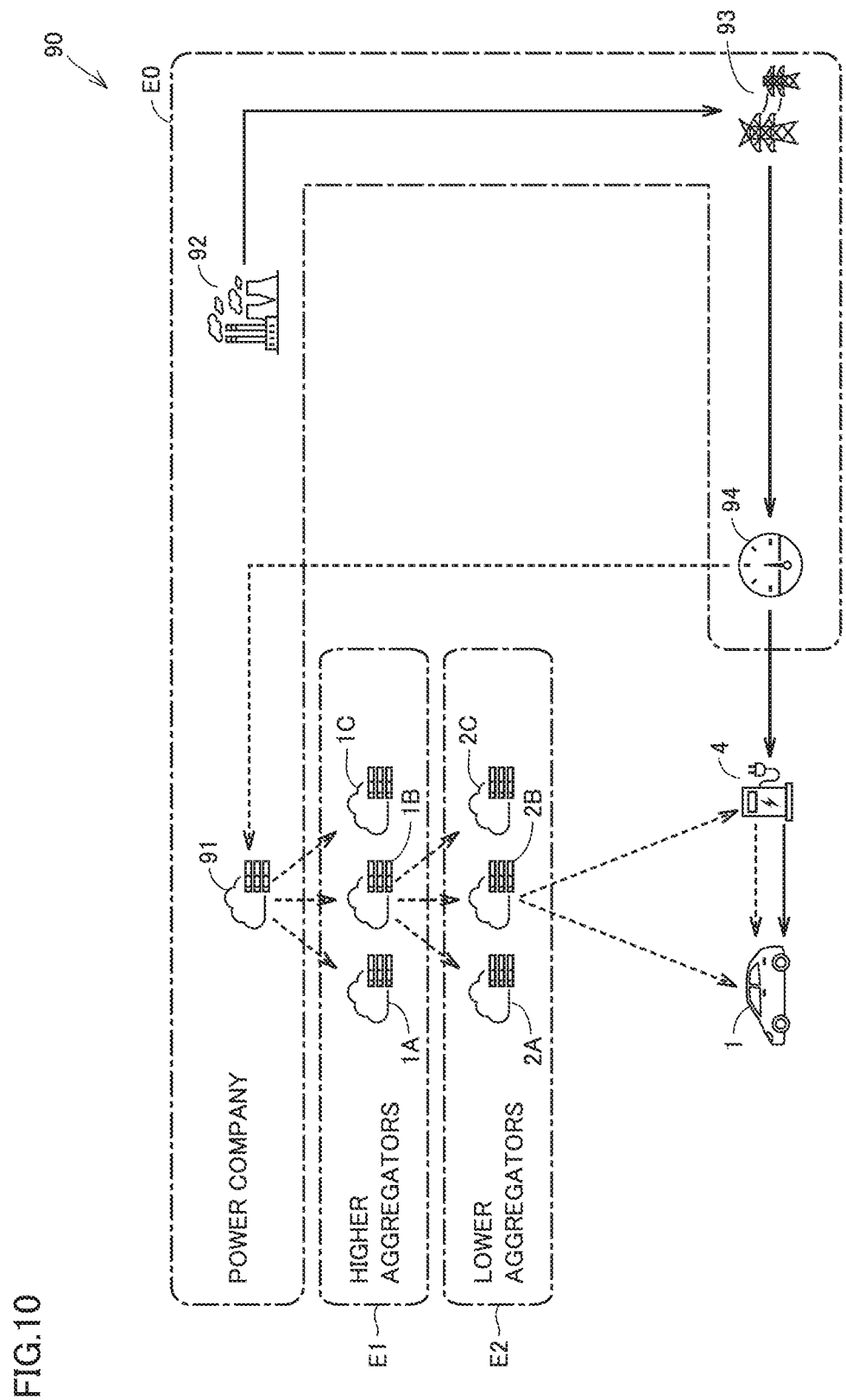
FIG. 10 is a diagram showing an overall configuration of a power system according to Variation 2 of the embodiment.

FIG. 10 is a diagram showing an overall configuration of a power system according to Variation 2 of the embodiment. Referring to FIG. 10, a power system 90 includes a power company E0, multiple higher aggregators E1, and multiple lower aggregators E2. Note that the aggregator refers to a service provider providing energy management services in VPP.

Power company E0 generates and supplies power. Power company E0 includes a server 91, a power plant 92, power transmission and distribution equipment 93, and a smart meter 94. Server 91 manages information about multiple higher aggregators E1 within the region. Power plant 92 includes a power generating device for generating electricity, and is configured to supply the power transmission and distribution equipment 93 with the power generated by the power generating device. Power transmission and distribution equipment 93 includes power transmission lines, sub-stations, and power distribution lines, and is configured to transmit and distribute the power supplied from power plant 92. Power plant 92 and power transmission and distribution equipment 93 constitute a power system (a power grid). Smart meter 94 is configured to meter power usage after every predetermined time period, and store the metered power usage and also transmit it to server 91. Charging station 4 is connected to the power system of power company E0 via smart meter 94.

Multiple higher aggregators E1 each manage multiple lower aggregators E2. Each higher aggregator E1 includes multiple servers 1A, 1B, and 1C provided for each higher aggregator E1. Each lower aggregator E2 includes multiple servers 2A, 2B, and 2C provided for each lower aggregator E2. Servers 2A to 2C each have the functions as those of server 2 described in the embodiment (see FIG. 2). Thus, in the following, server 2B will be described representatively. Server 2B controls the amount of electric power provided to and/or received from each customer.

Power company E0, multiple higher aggregators E1, and multiple lower aggregators E2 can adjust the balance of supply and demand of power by an approach called a demand response (DR), thereby changing the power demand pattern.

More specifically, server 91 transmits a signal for soliciting to participate in DR (DR participation solicitation) to each higher aggregator E1. In the example shown in FIG. 10, if received the DR participation solicitation, server 1B determines an amount of electric power (DR possible amount) that is adjustable in accordance with DR, and transmits the DR possible amount to server 91. For example, server 1B sends a query to servers 2A to 2C provided in lower aggregator E2, thereby obtaining the DR possible amounts of lower aggregators E2. Server 91 determines an amount of power adjustment to request each higher aggregator E1 for, based on the DR possible amounts received from servers 1A to 1C included in higher aggregator E1, and transmits a signal for instructing execution of DR (first DR execution instruction) to each higher aggregator E1.

If the above-mentioned query is raised from server 1B, server 2B included in lower aggregator E2 determines DR capacity of lower aggregator E2 corresponding to server 2B, based on the information related to vehicle 1 and charging station 4, and transmits the DR capacity to server 1B. Upon receipt of the first DR execution instruction from server 91, server 1B determines an amount of electric power adjustment to request from lower aggregator E2, based on the DR capacities received from servers 2A to 2B included in lower aggregator E2, and transmits a signal for instructing the execution of DR (a second DR execution instruction) to each lower aggregator E2.

Figure 11:
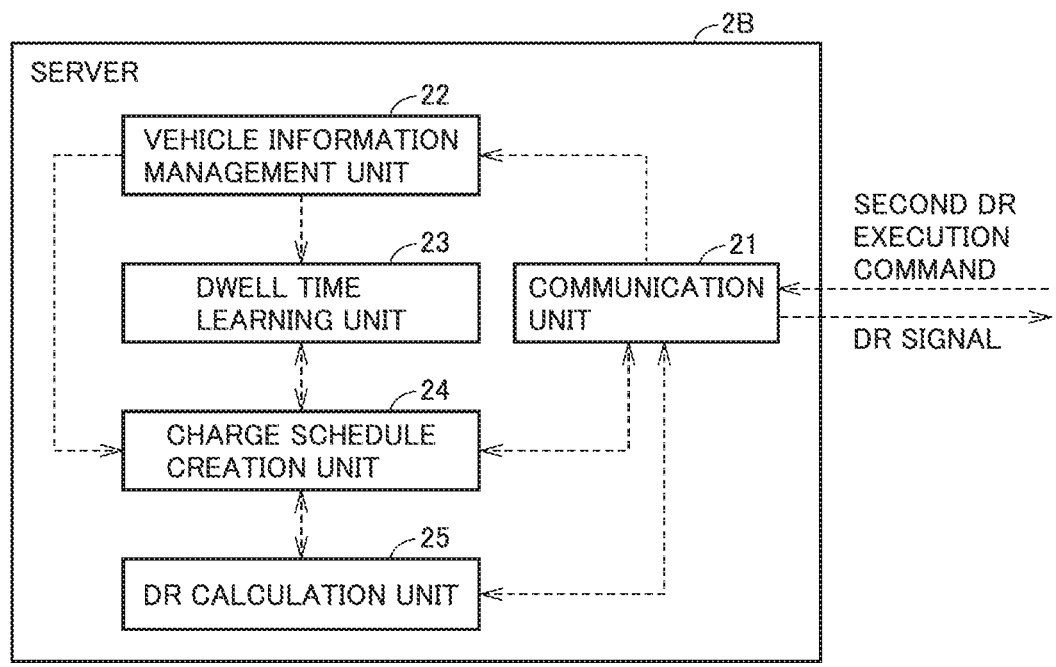
FIG. 11 is a functional block diagram of a configuration of a server according to Variation 2 of the embodiment.

FIG. 11 is a functional block diagram showing a configuration of server 2B according to Variation 2 of the embodiment. Referring to FIG. 11, server 2B is different from server 2 according to the embodiment (see FIG. 3) in that server 2B transmits the DR signal or receive a second DR execution instruction through communication unit 21, and further includes a DR calculation unit 25.

Upon receipt of the second DR execution instruction through communication unit 21, DR calculation unit 25 allocates the DR quantity to each vehicle 1 that can respond to DR, among vehicles 1 within the jurisdiction, and creates a DR signal for each vehicle 1. The DR signal created is transmitted to each vehicle 1. The DR signal contains a DR (negawatt DR) soliciting a reduction of power demand or a DR (posiwatt DR) soliciting an increase of power demand, and a DR quantity and a DR duration for each vehicle 1.

Here, it is also contemplated that during a time period in which a power demand peak occurs (e.g., time periods before and after an evening meal), higher aggregator E1 transmits a negawatt DR signal for soliciting a reduction of the electricity usage to server 2B included in lower aggregator E2. This is because server 2B can reduce the power demand accompanied with external charging of vehicle 1 by, for example, delaying the execution of the external charging, thereby enabling the power demand peak to be leveled out. However, in Variation 2, even if server 2B receives the negawatt DR signal, server 2B prioritizes performing the pre-charging after the connection to the charging cable over a control corresponding to the negawatt DR (a power demand reduction control).

Figure 12:
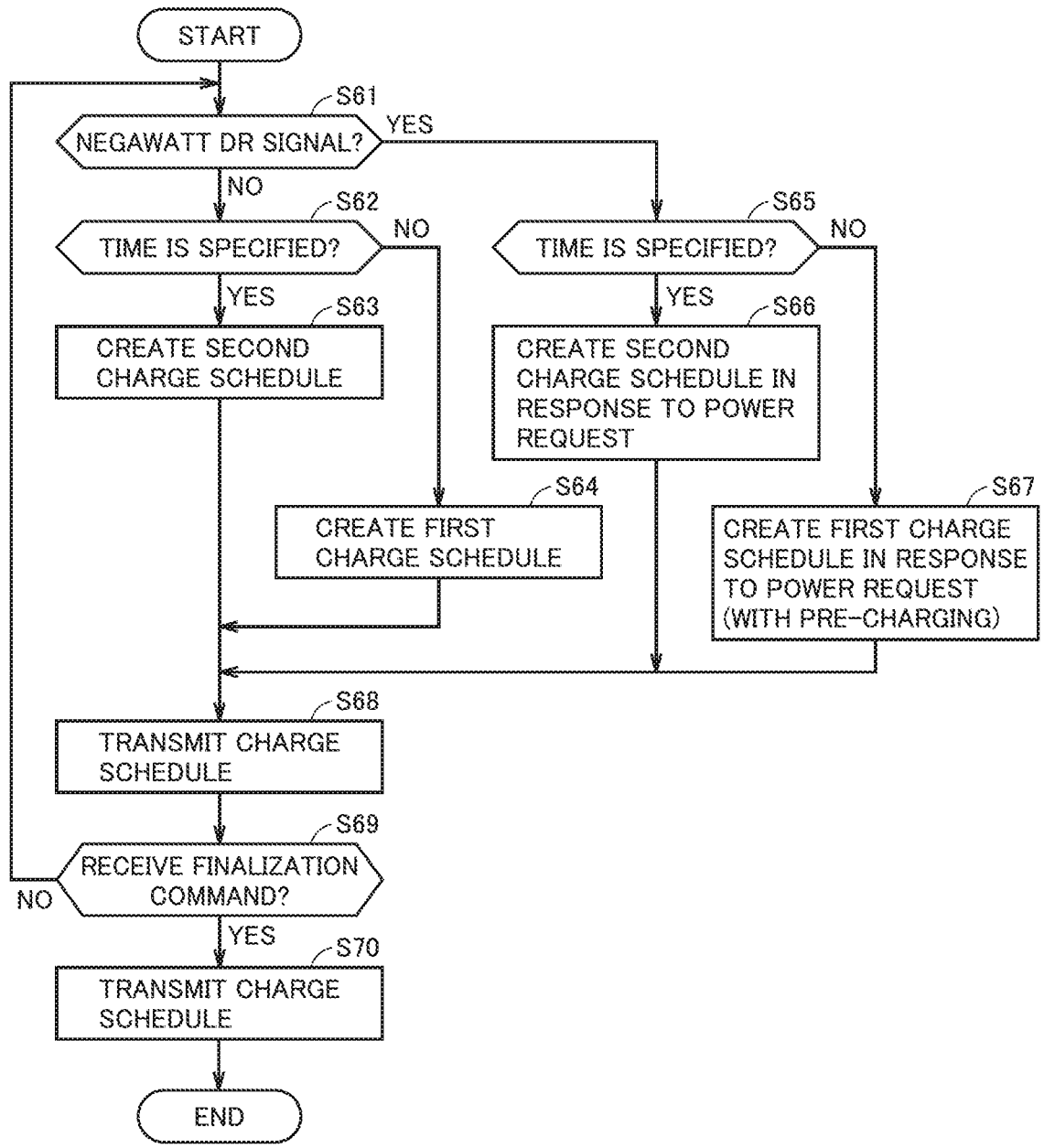
FIG. 12 is a flowchart illustrating the procedure of a charge schedule creation process according to Variation 2 of the embodiment.

FIG. 12 is a flowchart illustrating the procedure for a charge schedule creation process according to Variation 2 of the embodiment. Due to space constraints, FIG. 12 shows only a series of processes that is performed by server 2B. Processes performed by vehicle 1 or handheld device 3 are the same as those described in the embodiment (see FIG. 7).

Referring to FIG. 12, in S61, server 2B determines whether server 2B has received, from higher aggregator E1, the negawatt DR signal soliciting reduction of the power demand. If not having received the negawatt DR signal (NO in S61), server 2B proceeds the process to S62. The processes in S62 through S64 are the same as those in S21 through S23, respectively, according to the embodiment (see FIG. 7).

If having received the negawatt DR signal (YES in S61), server 2B proceeds the process to S65, and determines whether the charging information transmitted from vehicle 1 contains user-specified-time information.

If the charging information contains the user-specified-time information (YES in S65), server 2B creates a second charge schedule (S66). Specifically, server 2B creates a second charge schedule which allows the external charging to be completed by the time specified by the user and as much power as possible to be charged to battery 12 during the midnight time period. Server 2B takes into account the negawatt DR signal when creating the second charge schedule. In other words, if the time at which a power demand peak occurs delays into the midnight time period, server 2B creates a second charge schedule which allows the external charging to start after the end of the power demand peak in order to level out the power demand peak.

In contrast, if the charging information contains no user-specified-time information (NO in S65), server 2B creates a first charge schedule (S67). In Variation 2, server 2B, even if it has received the negawatt DR signal, incorporates into the first charge schedule the pre-charging which charges battery 12 until SOC of battery 12 reaches a predetermined value (e.g., 50%). On the other hand, for the remaining amount of power to charge to the battery 12 during the midnight time period after the pre-charging, a first charge schedule is created which causes the external charging to start after the end of the power demand peak.

If any of the processes in S63, S64, S66, and S67 ends, server 2B transmits the created charge schedule to handheld device 3 (S68). The process in S69 and the subsequent processes are the same as those according to the embodiment, and thus the detailed description thereof will not be repeated.

As described above, also in Variation 2 of the embodiment, server 2B uses the first charge schedule and the second charge schedule, depending on whether the time is specified by the user or not. In this way, also in Variation 2, as with the embodiment, the reduction of the electricity cost and ensuring of the EV range are enabled to reconcile with each other.

Furthermore, in Variation 2 in which the VPP is constructed, when the charging information contains no user-specified-time information, server 2B, even if it has received the negawatt DR signal, performs the pre-charging, disregarding the negawatt DR signal. In other words, charging of minimum requisite power to battery 12 takes precedence over avoiding of a power demand peak time period. This means that more emphasis is placed on ensuring of the EV range of vehicle 1 in Variation 2 than contributing to leveling out the power demand. This eliminates the user's concern as to whether EV travel is possible, allowing greater user comfort.

Although the present disclosure has been described and illustrated in detail, it is clearly understood that the same is by way of illustration and example only and is not to be taken by way of limitation, the scope of the present disclosure being interpreted by the terms of the appended claims.

What is claimed is:

1. A charge control device for external charging, the external charging being charging a power storage device mounted in a vehicle with a power supplied from charging equipment located outside the vehicle, the charge control device comprising:
   a learning unit that learns a departure time of the vehicle; and
   a creation unit that creates a charge schedule for the external charging, based on a learning result of the learning unit, wherein
   the creation unit
      creates a first charge schedule when time information for determining a time to perform the external charging is not given from a user of the vehicle, and
      creates a second charge schedule when the time information is given from the user, wherein
   in the first charge schedule, the power storage device is pre-charged with some of power to be charged to the power storage device, and, after the pre-charging is performed, the power storage device is charged with a remaining amount of the power during a time period in which an electricity cost is inexpensive, and
   in the second charge schedule, the power storage device is charged, without the pre-charging being performed.

2. The charge control device according to claim 1, wherein
   the vehicle is capable of the external charging at a plurality of charging spots, and
   the learning unit learns a dwell time of the vehicle for each charging spot, and
   the creation unit creates the first charge schedule based on a learning result of the dwell time with respect to a charging spot at which the vehicle is dwelling, among the plurality of charging spots.

3. The charge control device according to claim 1, wherein
   the pre-charging is a charging control which starts charging of the power storage device immediately once an external-charging feasible condition is met.

4. The charge control device according to claim 1, wherein
   the time information includes at least one of information related to a time at which the vehicle is expected to leave the charging equipment after the external charging is performed and information related to a time at which the user wished to perform the external charging.

5. The charge control device according to claim 1, wherein
   when the time information is not given from the user, the creation unit creates the first charge schedule even if the charge control device is solicited to reduce electricity usage for a demand response for adjusting electricity usage of an entirety of the power system.

6. A vehicle, comprising:
   a power storage device capable of external charging using a power supplied from charging equipment located outside the vehicle; and
   a control device that control the external charging, wherein
   the control device includes a learning unit that learns a departure time of the vehicle, and a creation unit that creates a charge schedule for the external charging, based on a learning result of the learning unit, wherein the creation unit creates a first charge schedule when time information for determining a time to perform the external charging is not given from a user of the vehicle, and creates a second charge schedule when the time information is given from the user, wherein in the first charge schedule, the power storage device is pre-charged with some of power to be charged to the power storage device, and, after the pre-charging is performed, the power storage device is charged with a remaining amount of the power during a time period in which an electricity cost is inexpensive, and in the second charge schedule, the power storage device is charged, without the pre-charging being performed.

7. A charge control method for external charging, the external charging being charging a power storage device mounted in a vehicle with a power supplied from a charging equipment located outside the vehicle, the charge control method comprising:

creating a first charge schedule when time information for determining a time to perform the external charging is not given from a user of the vehicle; and creating a second charge schedule when the time information is given from the user, wherein in the first charge schedule, the power storage device is pre-charged with some of power to be charged to the power storage device, and, after the pre-charging is performed, the power storage device is charged with a remaining amount of the power during a time period in which an electricity cost is inexpensive, and in the second charge schedule, the power storage device is charged, without the pre-charging being performed.

* * * * *